A. O. GIHRE.
TARGET.
APPLICATION FILED JUNE 2, 1915.
1,186,766.
Patented June 13, 1916.
2 SHEETS—SHEET 1.
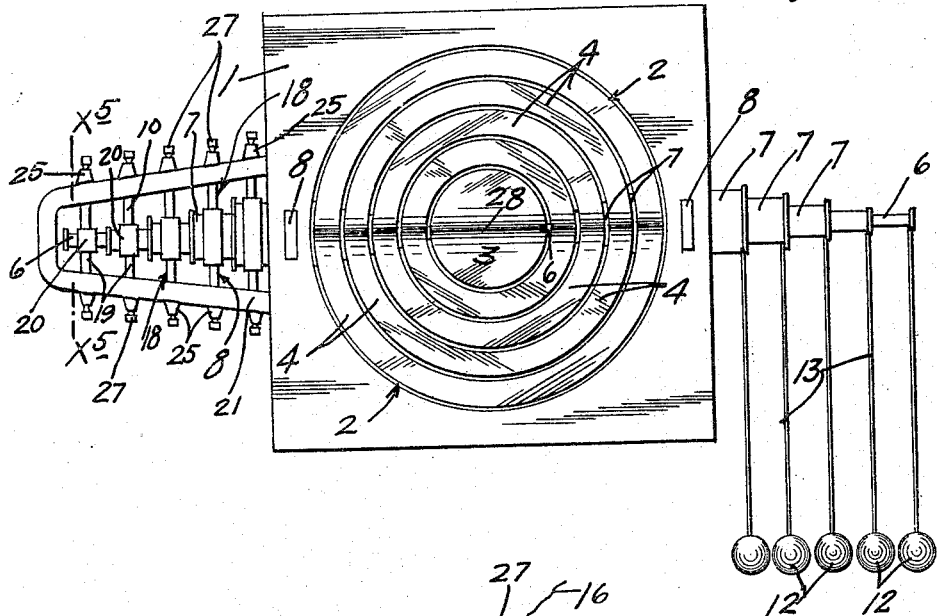
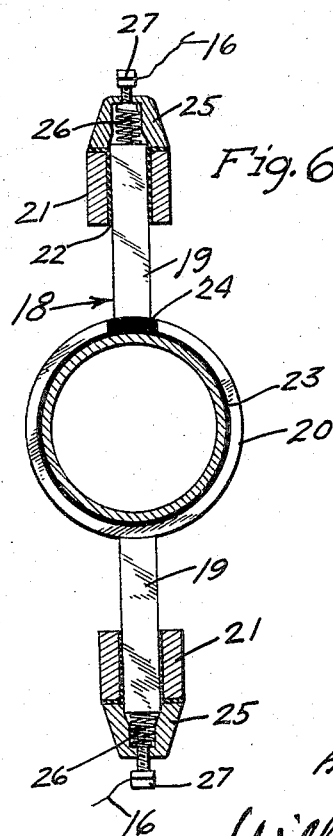
WITNESSES
E. C. Skinkle
A. H. Opsahl
INVENTOR
Andrew O. Gihre
BY HIS ATTORNEYS
Williamson & Burchard

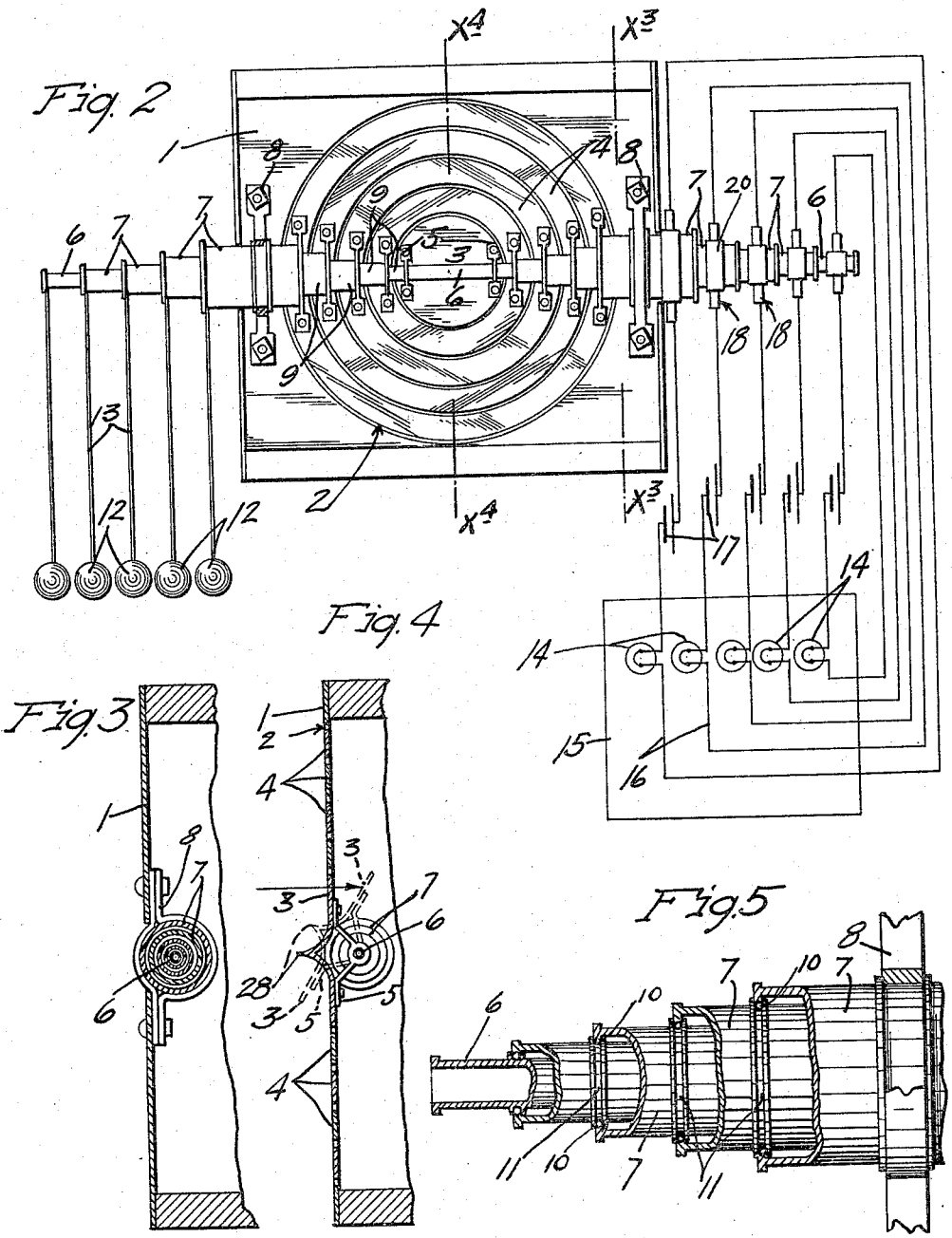

UNITED STATES PATENT OFFICE.

ANDREW O. GIHRE, OF CHRISTIANIA, NORWAY.

TARGET.

1,186,766.  Specification of Letters Patent. Patented June 13, 1916.

Application filed June 2, 1915. Serial No. 31,780.

*To all whom it may concern:*

Be it known that I, ANDREW O. GIHRE, a subject of the King of Norway, residing at Christiania, Norway, have invented certain new and useful Improvements in Targets; and I do hereby declare the following to be a full, clear, and exact description of the invention, such as will enable others skilled in the art to which it appertains to make and use the same.

My invention relates to improvements in self-scoring targets; and, to this end, it consists of the novel devices and combinations of devices hereinafter described and defined in the claims.

In the accompanying drawings, which illustrate the invention, like characters indicate like parts throughout the several views.

Referring to the drawings:—Figure 1 is a front elevation of the improved target; Fig. 2 is a rear elevation, some parts being shown diagrammatically; Fig. 3 is a vertical section, taken on the line $X^3 X^3$ of Fig. 2, on an enlarged scale; Fig. 4 is a vertical section, taken on the line $X^4 X^4$ of Fig. 2, on an enlarged scale; Fig. 5 is a detail view, partly in rear elevation and partly in section; and Fig. 6 is a vertical section taken on the line $X^5 X^5$ of Fig. 1, on an enlarged scale.

The numeral 1 indicates a rectangular target frame having a large axial opening 2, within which is mounted the improved target. This target comprises a bull's-eye and a plurality of concentric rings 4, mounted for independent oscillatory movements in a vertical plane.

Anchor brackets 5, on the back of the bull's-eye 3, rigidly connect the same to the intermediate portion of a horizontal tubular shaft 6. This shaft 6 is loosely journaled in the inner or smaller members of two series of concentric bearing sleeves 7, with its ends projecting therebeyond. The two series of bearing sleeves 7 are located at diametrically opposite points at the back of the target frame 1, and the outer or larger members thereof are journaled in bearing brackets 8, rigidly secured to the back of the target frame 1. The bearing sleeves 7 of each series are made progressively longer from the outer member inward, and the inner ends of the bearing sleeves of each series are rigidly secured, by anchor brackets 9, to the target rings 4. It will be noted that the progressively longer bearing sleeves 7 are anchored respectively to the progressively smaller target rings 4. To permit the shaft 6 and bearing sleeves 7 to oscillate one upon the other and within the bearing brackets 8 with only a minimum amount of friction, anti-friction bearing balls 10 are mounted in ball races 11 formed on said shaft, bearing sleeves, and bearing brackets.

The bull's-eye 3 and rings 4 of the improved target are independently and yieldingly held in normal position, in the plane of the target frame 1, by weights 12, suspended by flexible connections 13 from the outer projecting ends of the left hand series of bearing sleeves 7 and adjacent end of the shaft 6. These flexible connections 13 are arranged to be wound on the respective bearing sleeves 7 or shaft 6 under oscillatory movements of the bull's-eye and target rings.

When the bull's-eye 3 or one of the target rings 4 is struck by a bullet, the same is oscillated in a vertical plane and the oscillation registered at a distant point by an indicator 14. As shown, there is one of these indicators for the bull's-eye and one for each target ring 4, and they are in the form of electric lamps mounted on an indicator board 15, each in an electric circuit 16. In each electric circuit there is also a battery 17, or other source of energy, and a circuit breaker 18. There is one of these circuit breakers 18 on the right hand end of the shaft 6 and the outer projecting ends of each of the bearing sleeves 7 of the right hand series. Each of these circuit breakers 18 comprises a pair of diametrically opposite brushes 19, and a contact ring 20. The contact brushes 19 are mounted on a bracket 21 with freedom for limited endwise movement, with their inner ends engaging the contact rings 20. There is one contact ring 20 on the shaft 6, and one on each bearing sleeve 7 of the right hand series. The bracket 21 is rigidly secured to the target frame 1 and the brushes 19 are insulated therefrom by bushings 22 of suitable insulating material. The contact rings 20 are also insulated from the shaft 6 and bearing sleeves 7 by suitable insulated bushings 23. Each contact ring 20 is also provided with an insulated section 24 with which one of the respective pair of brushes 19 normally engages to break the electric circuit.

Mounted on the bracket 21, opposite the outer end of each brush 19, is a cap 25 which affords a base of resistance for a coiled spring 26 and a seat for a binding post 27. The springs 26 yieldingly hold the brushes 19 in engagement with the contact rings 20, and the insulated sections 24. The circuit wires 16 attached to the binding posts 27, together with the springs 26, complete the connections between the circuit wires and the brushes 19.

Integrally formed with the outer faces of the bull's-eye 3 and target rings 4 is a knife edge bullet deflecting rib 28 which projects radially and horizontally from the shaft 6. The purpose of this rib 28 is to deflect the bullets which would otherwise strike the bull'e-eye or target rings directly in front of the shaft 6 and thereby prevent their oscillation. Bullets deflected by the rib 28 will strike the bull'e-eye or target ring either above or below the shaft 6 and thereby oscillate the same to flash the indicators 14.

When the bull's-eye 3 or one of the target rings 4 is oscillated by being struck by a bullet, said oscillation will carry the respective insulated section 24 out of contact with the brush 19, engaging the same, thereby completing the circuit and flashing the respective indicator so that the person firing the shot, or the person keeping the score, may note the point on the target struck by the bullet. The bull's-eye or target ring struck and oscillated by a bullet will be immediately returned to normal position under the action of the respective weight 12.

What I claim is:

1. A target mounted on an axis parallel to its face for oscillatory movement, and a pendulum-like weight independent of the target and tending to hold the same in a normal position.

2. A target comprising a plurality of yieldingly held concentric members mounted for swinging movement on a common axis extending diametrically across said members, and an indicator actuated by the movement of one of the members.

3. In a self-scoring target, the combination with a target made up of yieldingly held concentric members mounted for swinging movement on a common axis extending diametrically across said members, of an indicator circuit for each member of the target, comprising a source of energy, a circuit closer operated by the movement of one of the members, and an indicator.

4. In a self-scoring target, the combination with a target made up of gravity held concentric members mounted for swinging movement on a common axis extending diametrically across said members, of an indicator circuit for each member of the target comprising a source of energy, a circuit closer operated by the movement of one of the members and an indicator.

5. In a self-scoring target, the combination with a target frame, of a target made up of a plurality of concentric rings, and a bull's-eye secured to concentric bearing sleeves mounted on the target frame to oscillate on a common axis, means for yieldingly holding the target ring and bull's-eye in normal positions, an electric circuit for each target ring and the bull's-eye, comprising a source of energy, a circuit closer operated by the movement of the rings or bull's-eye, and an indicator.

6. In a self-scoring target, the combination with a target made up of a plurality of concentric rings and a bull's-eye, two series of concentric axially alined bearing sleeves, the bearing sleeves of each series being progressively longer from the outer sleeves inward and anchored at their inner ends to the progressively smaller target rings, a shaft journaled in the innermost bearing sleeves and having the bull's-eye secured thereto for oscillations therewith, yielding means tending to hold the target rings and bull's-eye in normal positions, and an indicator arranged to be actuated by the movement of the target rings and the bull's-eye.

7. In a self-scoring target, the combination with a target made up of a plurality of concentric rings and a bull's-eye, two series of concentric axially alined bearing sleeves, the bearing sleeves of each series being progressively longer from the outer sleeves inward and anchored at their inner ends to the progressively smaller target rings, a shaft journaled in the innermost bearing sleeves and having the bull's-eye secured thereto for oscillations therewith, a weight suspended by a flexible connection from the outer end of each bearing sleeve of one series, and from the adjacent end of the shaft, an electric circuit for each target ring and the bull's-eye, comprising a source of energy, a circuit closer operated by the movement of the rings or the bull's-eye, and an indicator, said circuit closers being located at the outer ends of the bearing sleeves of the other series and the adjacent end of the shaft.

8. In a self-scoring target, the combination with a target frame, of a target made up of a plurality of concentric rings, and a bull's-eye mounted on concentric bearing sleeves carried on the target frame, a deflecting rib extending across the outer faces of the target rings and the bull's-eye, means for yieldingly holding the target ring and the bull's-eye in normal positions, an electric circuit for each target ring and the bull's-eye, comprising a source of energy, a circuit closer operated by the movement of the rings or bull's-eye, and an indicator.

9. In a self-scoring target, the combination with a target frame, of a target mounted on the target frame, comprising a plurality of concentric rings and a bull's-eye, two series of axially alined concentric bearing sleeves, the outer of said bearing sleeves being journaled on the target frame at diametrically opposite points, the bearing sleeves of each series being progressively longer from the outer sleeve inward and anchored at their inner ends to the progressively smaller target rings, a shaft journaled in the innermost bearing sleeves and having the bull's-eye secured thereto for oscillations therewith, a weight suspended by a flexible connection from the outer end of each bearing sleeve of one series, and from the adjacent end of the shaft, an electric circuit for each target ring and the bull's-eye, comprising a source of energy, a circuit closer operated by the movement of the rings or the bull's-eye, and an indicator, said circuit closers being located at the outer ends of the bearing sleeves of the other series and the adjacent end of the shaft.

In testimony whereof I affix my signature in presence of two witnesses.

ANDREW O. GIHRE.

Witnesses:
TORKILD E. FINSAND,
ODIN O. LAUGSHIF.

Copies of this patent may be obtained for five cents each, by addressing the "Commissioner of Patents, Washington, D. C."